July 23, 1935.  E. RIMAILHO  2,009,276

VEHICLE OF ANY TYPE, AND MORE PARTICULARLY IN RAILWAY CARRIAGES

Filed Nov. 28, 1932  10 Sheets-Sheet 2

E. Rimailho
INVENTOR

By Marks & Clerk
Attys.

July 23, 1935. E. RIMAILHO 2,009,276
VEHICLE OF ANY TYPE, AND MORE PARTICULARLY IN RAILWAY CARRIAGES
Filed Nov. 28, 1932 10 Sheets-Sheet 7

E. Rimailho
INVENTOR
By Marks & Clark
Attys.

July 23, 1935.   E. RIMAILHO   2,009,276

VEHICLE OF ANY TYPE, AND MORE PARTICULARLY IN RAILWAY CARRIAGES

Filed Nov. 28, 1932   10 Sheets-Sheet 10

E. Rimailho
INVENTOR

By Marks & Clerk
ATTYS.

Patented July 23, 1935

2,009,276

UNITED STATES PATENT OFFICE 2,009,276

VEHICLE OF ANY TYPE, AND MORE PARTICULARLY IN RAILWAY CARRIAGES

Emile Rimailho, Paris, France

Application November 28, 1932, Serial No. 644,727
In France December 3, 1931

8 Claims. (Cl. 105—215)

This invention relates to improvements in railway carriages or like vehicles for the purpose of improving the suspension of the same and the propulsion where a motor vehicle is under consideration, while allowing in the case of a railway carriage, to secure in a very simple manner the guiding of the same on rails and its ready conversion from rail to road circulation.

In the vehicle according to the invention, independent wheel sets respectively support separate elements of the vehicle, for instance the underframe and the floor supporting either the seats or the motor, the two said elements being vertically movable relatively to each other.

Considering e. g. a railway carriage, one of its wheel sets will be a steering set and will have wheel flanges ensuring guiding on the rails, while the other wheel set will be a carrying set and will have no such flanges. Where the vehicle is self-propelling, the driving wheels may be those of one or the other set depending on circumstances.

This arrangement is particularly convenient where either resilient-wheel drive or a particularly comfortable suspension is desired for one of the elements of the vehicle. For instance, in the above mentioned case, it allows of mounting the floor on wheels provided with pneumatic tyres or with flexible steel tyres, the wheels being eventually of the spring hub type.

The underframe-carrying wheels, which may be of the spring hub type, are provided with guide flanges and those carrying the floor may have no steering action as they are steered by the others.

The possibility of doing away with the guide flange in the latter is very advantageous in that the yielding of the pneumatic tyre or of the flexible tyre will not be limited as it would be by a flange which in moving vertically against the rail by reason of the movements of the axle would soon come into contact with the rail bottom, for instance at a crossing.

Besides, where resilient wheels are used as possessing better qualities than other wheels when acting as driving wheels, the device will allow to exactly adjust the maximum weight they may have to carry, as beyond this weight the frame of the driving set will rest on the frame of the steering set, the independency of the sets being maintained for any load below the said weight Another object of the invention consists in a device allowing to transfer an adjustable fraction of the weight from one of the frames to the other.

A further object of the invention is to design the axles or bogies belonging to different wheel sets with a view to adapt the same for relative side displacements allowing the negotiation of curves, so that the existence of such curves of the track will not impose undue limitations on the wheel-base.

Various embodiments of the subject-matter of the invention will now be described by way of example only, reference being had to the accompanying drawings, in which:

Fig. 1 is a diagrammatic longitudinal section of a railway carriage.

Figs. 2 to 7 relate to arrangements allowing to transfer an adjustable fraction of the weight from one of the frames to the other.

Figs. 8—9, 10—11, 12—13, 14—15, 16—17 respectively illustrate various embodiments of devices allowing the lateral displacement of the axles.

Figs. 8, 10, 12, 14, 16 are fractional side elevational views.

Figs. 9, 11, 13, 15, 17 are corresponding plan views.

Figure 1:
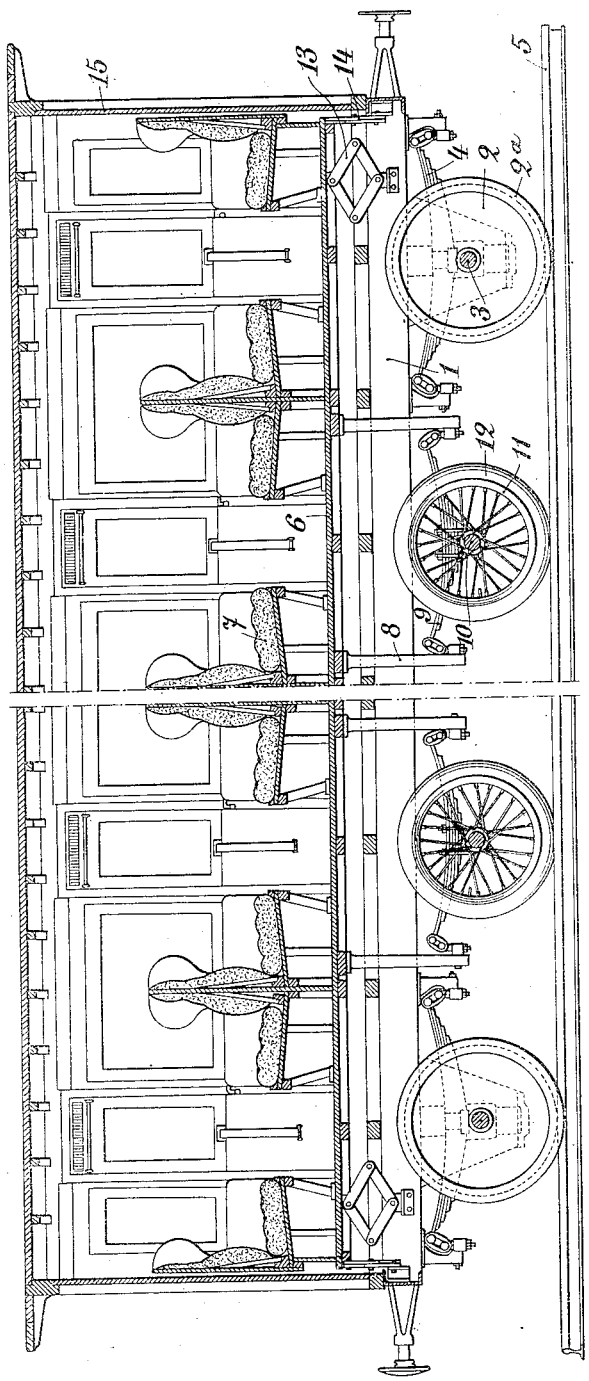

The carriage illustrated in Fig. 1 is carried by a framework the frame 1 of which is carried by wheels 2 through the intermedium of axles 3 and of bearing springs 4. These parts, whether of the spring hub type or not, are similar to those of ordinary railway carriages, and in particular the wheels 2 are provided with flanges 2a whereby the carriage is guided on the rails 5 according to the usual arrangements.

The floor 6 which as shown carries benches 7 for the passengers and which also may receive the driving unit is carried through the intermedium of uprights 8, bearing springs 9 and axles 10 by a set of wheels 11 wholly independent from the wheels 2. The wheels 11, which may be equipped with any devices adapted to provide a very flexible suspension, e. g. with resilient spokes or pneumatic tyres 12, have no steering action, which ensures important advantages in that they have no guide flanges which will rub dangerously against the rail where the tyre tread is out of shape.

The entire structure is so designed that the floor 6 can move freely up and down with respect to the frame 1, that it may completely preserve the flexibility of its suspension, but not lengthwise or crosswise.

This result can be obtained by causing rods, segments, or roller guide devices rigid with one of the two said members to slide in sockets or slides rigid with the other member.

The connection between the frames or between the axles and the frames will be provided e. g. by links which in the embodiment shown form a series of lozenges 13, 14. The former are parallel to the longitudinal median plane of the carriage and have their lower and upper ends pivoted to the frame side sills or axles and to the floor respectively, while the latter are arranged transversely and are pivoted to the frame cross beams or the axles and to the floor.

These lozenges 13, 14 provide the longitudinal and the transversal connection of the said members respectively while allowing the relative vertical displacements of the floor and of the frame and axles.

The wheel sets 2, 12 are thus rendered wholly independent from each other, and each of them carries only that portion of the carriage to which it belongs.

The said wheel sets of course may be given any suitable shape, for instance they may constitute bogies or steering wheels in the same way as motor car wheels.

In the embodiment shown where the floor rests on the flangeless middle wheels providing maximum flexibility, the said floor will be loaded in the best condition if the wheels are flexible and act as driving wheels. All the remaining parts for which a most flexible suspension is less necessary will be supported on the frame in such manner that their weights will rest only on the outer wheels. Thus, the carriage body 15 will be supported on the frame.

Considering a self-propelling vehicle and where it is advisable that the heavier load should bear on the floor, the corresponding wheels (e. g. the middle wheels) will be provided if necessary with guide flanges while the driving wheels may be those of the frame, the latter being eventually lightened the said driving wheels being flangeless.

In the various cases considered, the conversion of a vehicle (whether self-propelling or not) from rail circulation to road circulation is made easier in that the driving wheels remain unchanged as they have no flanges; it is only necessary to carry out the change on the flanged wheels which now have to run on road tyres, for which purpose the latter are substituted for or superposed or juxtaposed to the former.

Of course, it is not necessary that the independent wheel sets supporting each part of the vehicle respectively should be so arranged that one of them, e. g. the one most flexible, be encompassed by two other wheel sets, as the invention also contemplates a vehicle wherein a wheel set is followed or preceded by another, the independency of the various wheel sets provided in any number in the conditions above set forth then being carried out in any suitable manner so that each of them shall act only as a carrying, a steering or a driving wheel set, or shall fulfill two of these functions at the same time or all three of them simultaneously. For instance, the arrangement known under the name of "Renard's train" wherein each wheel is compelled to follow the path of the preceding one might be employed.

A device applicable to vehicles of this type, and allowing to partly transfer the weight from one of the frames to the other either as desired or automatically will now be described.

This device thus allows to take advantage, in the best conditions of the desirable features of the vehicle according to the invention. Particularly, it will allow the driving wheels to carry that load which corresponds to maximum adhesion of the wheels considering the tyre conditions of the same.

Figure 2:
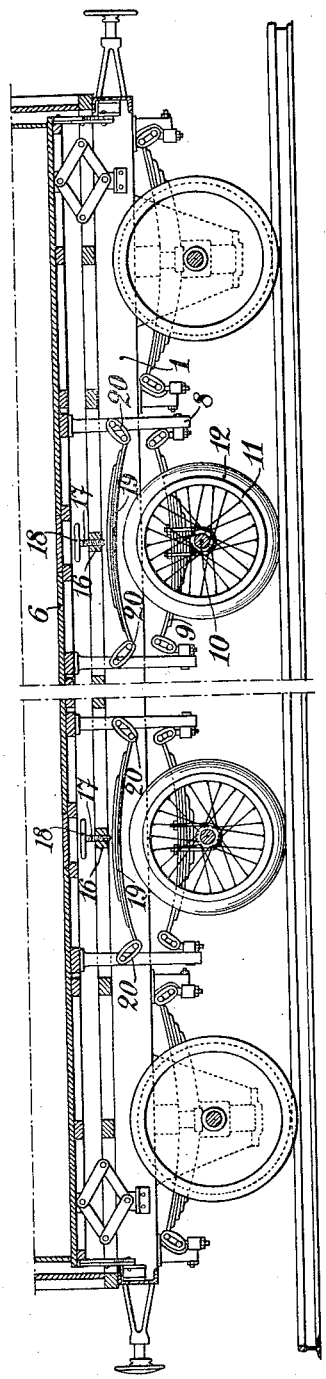
Fig. 2 is a longitudinal vertical section of one embodiment.

In the embodiment shown in Fig. 2 and assumed to be applied to the railway carriage described above those cross beams 16 of the carriage frame 1 which are located directly above the axles 10 have screw-threaded holes cut therein in which vertical spindles 17 provided with operating hand wheels 18 are screwed.

Arranged below each of the said spindles is a spring 19 connected at its ends through a pair of shackles 20 to one pair of the uprights 8 supporting the floor, or to any other members rigid with the latter. By screwing the spindles 17 in the cross beams 16, same can be caused to bear on the corresponding springs 19, whereby a greater or less portion of the weight of the frame 1 will be transmitted to the wheels 11, 12 carrying the floor depending on whether the said spindles are screwed by a greater or less amount.

Figure 3:
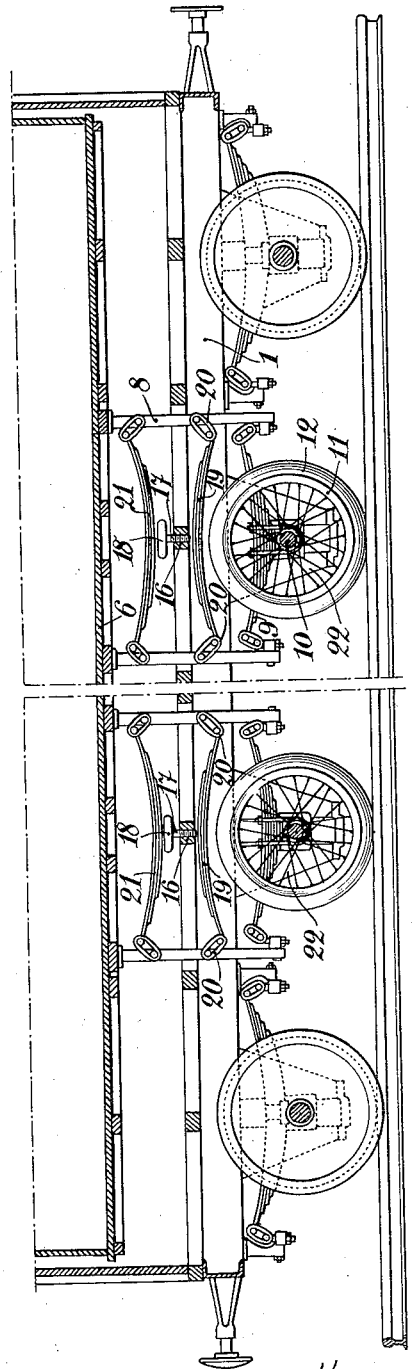
Fig. 3 is a similar view of a modification.

The device illustrated in Fig. 3 is provided in addition to the said springs 19 with springs 21 which also are carried by the uprights 8 and which are interposed between the floor 6 and the spindles 17.

Unscrewing the latter will cause them to bear under and stress the springs 21, whereby a greater or less portion of the weight supported by the floor and the wheels 11—12 will be transmitted to the frame 1 depending on whether the spindles are unscrewed by a greater or less amount.

Assuming e. g. that the vehicle is designed for 3-ton normal floor-load, one ton corresponding to the weight of the passengers transported, four devices similar to that described may be provided and arranged for transmitting a unitary load up to 250 kilograms, i. e. a total of one ton to the four wheels 11—12.

It is thus possible at all times to secure maximum adhesion of wheels 11—12, even when the vehicle runs empty.

Obviously, this device can be embodied in a great many different ways.

Figure 4:
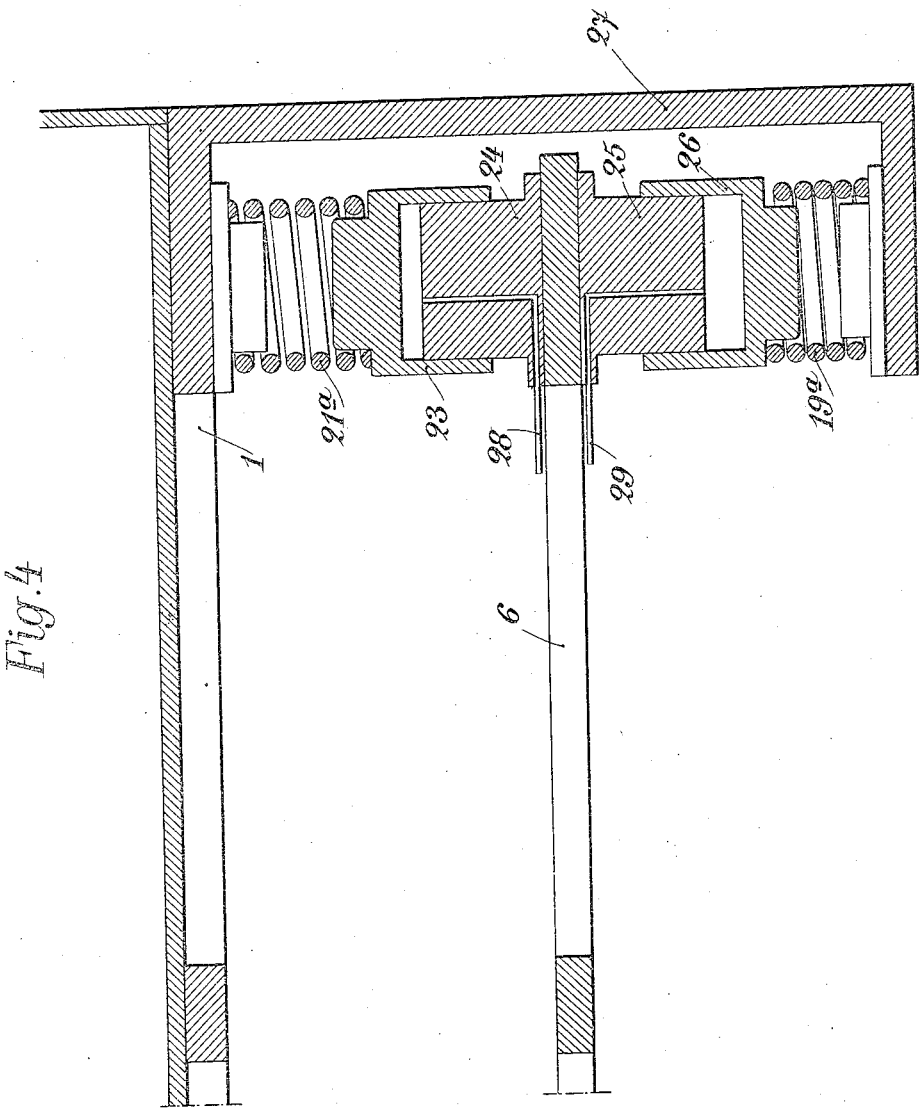
Fig. 4 is a fractional vertical cross-section of an embodiment comprising a pressure fluid control device.

According to Fig. 4, a pair of pistons 24, 25 slidably received in a pair of cylinders 23, 26 respectively carried by the frame 1 above and below the floor 6 with the interposition of springs 21a, 19a are secured on the upper and the lower faces of one of the frames (e. g. that of the floor 6).

A fluid, the pressure of which can be controlled, is admitted into these cylinders through a pair of conduits 22, 23, and the control of the pressure of the said fluid has the same effect as screwing or unscrewing the spindles 17 above mentioned.

It will be appreciated that such a device can easily be arranged for automatic operation.

The variation of the load on the floor 6 results in a greater or less deflection of the springs 9, and, consequently, modifies the distance between the floor 6 and the axles 10.

This variation of distance can be used to automatically control the above or any other equivalent device in such manner that the load on the axles as 10 shall at all times correspond to the best adhesion of the driving wheels where the vehicle is self-propelling.

It will be understood that any desired modification of the embodiment described above simply by way of example and not in a limiting sense may be made without departing from the scope of the invention. Thus, the vertical spindle 17 may be replaced by a piston adapted to push a coil spring or a leaf spring, the whole device being so designed as to bear on one of the elements of the vehicle and to transmit a predetermined stress to another element. The piston may be actuated mechanically, e. g. by means of a screw-jack, or pneumatically, the device then operating as a ball with a bladder, or hydraulically, by means of a suitable pump, or hydro-pneumatically, the device then comprising a reservoir filled with compressed air acting on a liquid.

Figure 5:
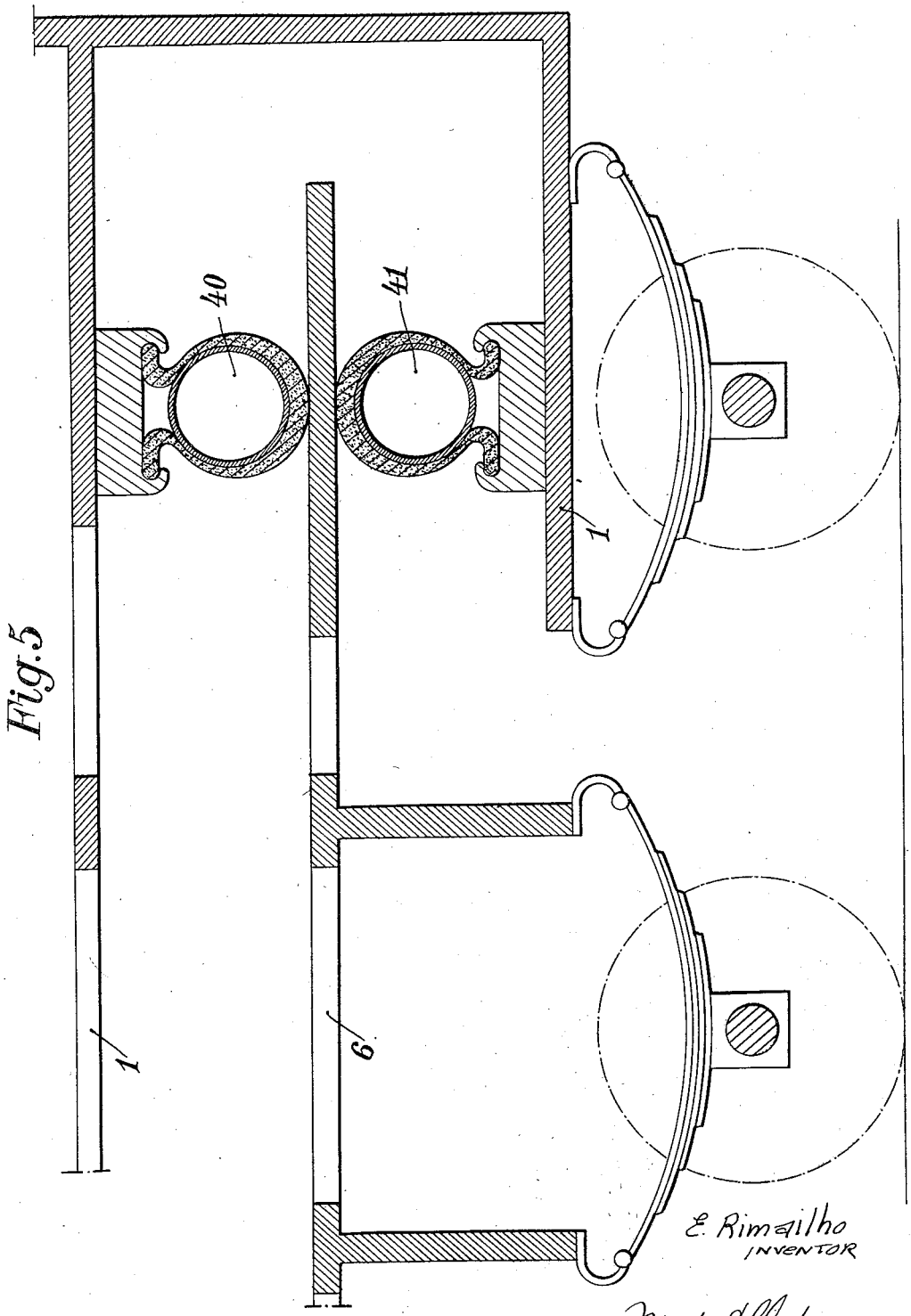
Fig. 5 is a fractional vertical cross-section of an embodiment comprising a pneumatic connection between the frames.

For instance, as shown in Fig. 5, interposed between the frame 1 and the floor 6 are chambers 40, 41 arranged above and below the floor and filled with compressed air. Any suitable means (not shown) are provided to cause the air pressure to vary automatically or as desired in these chambers for controlling the respective loads on both wheel sets.

The device may be so designed that the stresses generated thereby will be applied to any suitably chosen and eventually adjustable points. These points can be connected by pairs through any suitable transmission means, such as beams, inclines, a fluid pipe line, etc.

The automatic control responsive to the relative displacements of the floor 6 and of the axles carrying the same, can be designed very simply. When the thrust member is subjected to the action e. g. of a fluid under pressure a device may be used through which the displacements of the floor on this side of or beyond its position corresponding to optimum loading of the axles 10 will open a communication with the source of fluid or pressure or with a release member, by means of a suitable valve gear.

Figure 6:
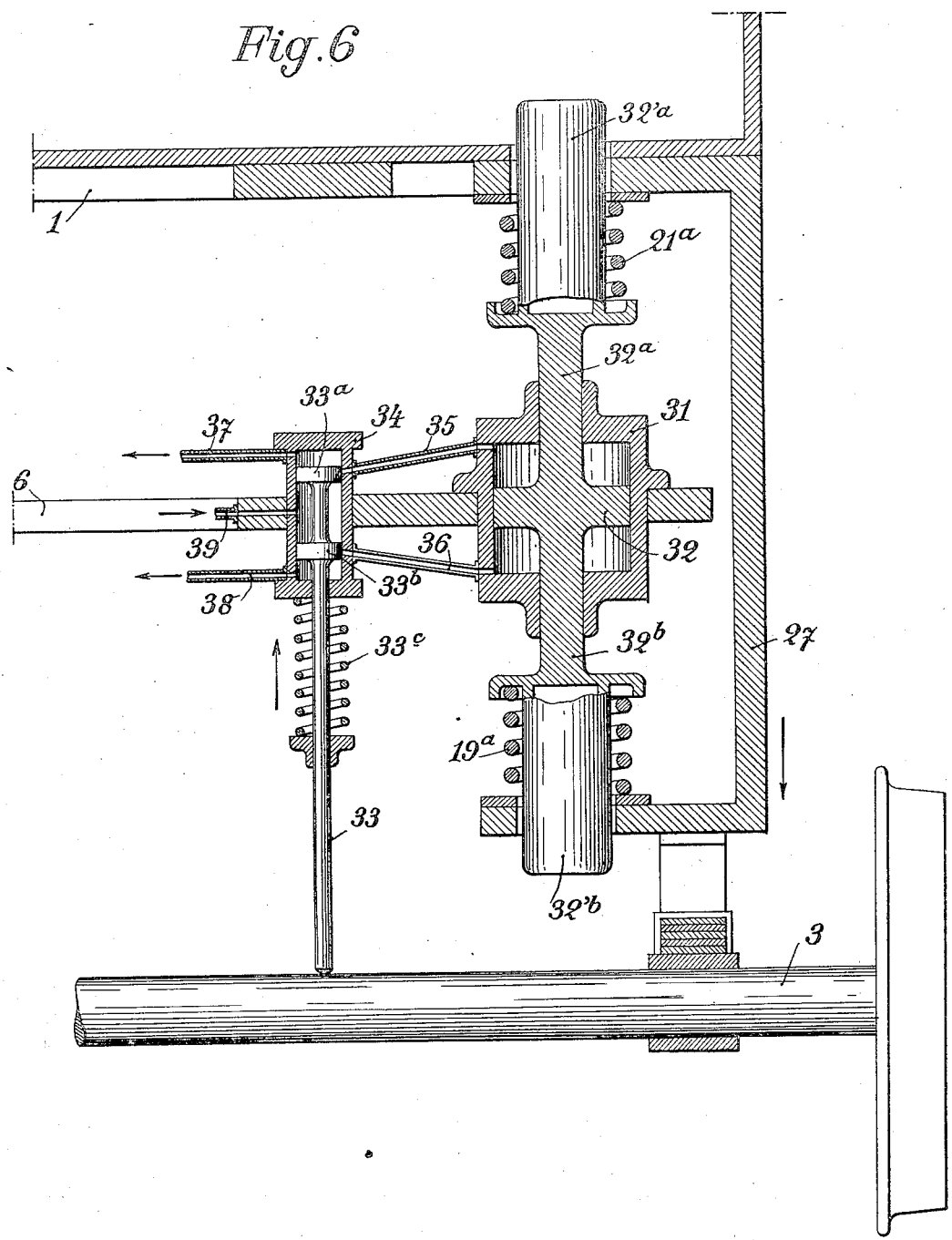
Fig. 6 is a vertical cross-section of an automatic arrangement for controlling the device.

Fig. 6 illustrates an embodiment of such an automatic control device.

In this embodiment, one of the two frames, e. g. frame 6, carries a cylinder 31 in which there slides a piston 32 rigid with a pair of rods 32a, 32b, the ends 32'a, 32'b of which slide vertically in orifices provided in the frame 1. Springs 21a, 19a similar to those already described are stressed between this frame and the said ends.

Conduits 35, 36 lead on the one hand to the ends of the cylinder 31 on either side of the piston 32 and on the other hand to the ends of a piston valve 34 rigid with the floor 6. Slidably received in the valve cylinder is one end of a rod 33 provided with a pair of shoulders 33a, 33b.

The other end of the rod 33 rests on one of the axles 3 carrying the frame 1, and is pressed against the said axle by a return spring 33c.

Finally, a conduit 39 for the admission of a driving fluid under pressure opens in the middle portion of the valve 34 between the two shoulders 33a, 33b, and two outlet conduits 37, 38 open at its ends.

The whole device in normal service conditions assumes the position shown in which the shoulders 33a, 33b close the orifices of the conduits 35, 36 respectively.

Assuming that the floor 6 sinks relatively to the frame 1, the rod 33 then will rise relatively to the cylinder 34, and the orifices of the conduits 35, 36 will be uncovered; the conduit 35 then communicates with the inlet orifice, and the conduit 36 with the outlet orifice.

It follows that a portion of the weight of the floor 6 is transferred to the frame 1, and that the whole structure comes back to its normal position.

Where a mechanical control is used, the displacement of the floor relatively to the axles may be made to control electric contacts, or mechanical transmission means actuating members for lifting the floor when the load is insufficient, or lowering these members when the optimum load is exceeded.

The automatic operation of the device may also be obtained through springs or like suitable resilient members having unequal flexibilities, the said members being interposed between either frame or between elements rigid with each of them respectively so that the load supported by one of the two wheel sets carrying the said frames may be maintained at an approximately constant value (or at least at a value remaining constantly between two definite limits), by transmitting the variations of the load to the other wheel set.

Figure 7:
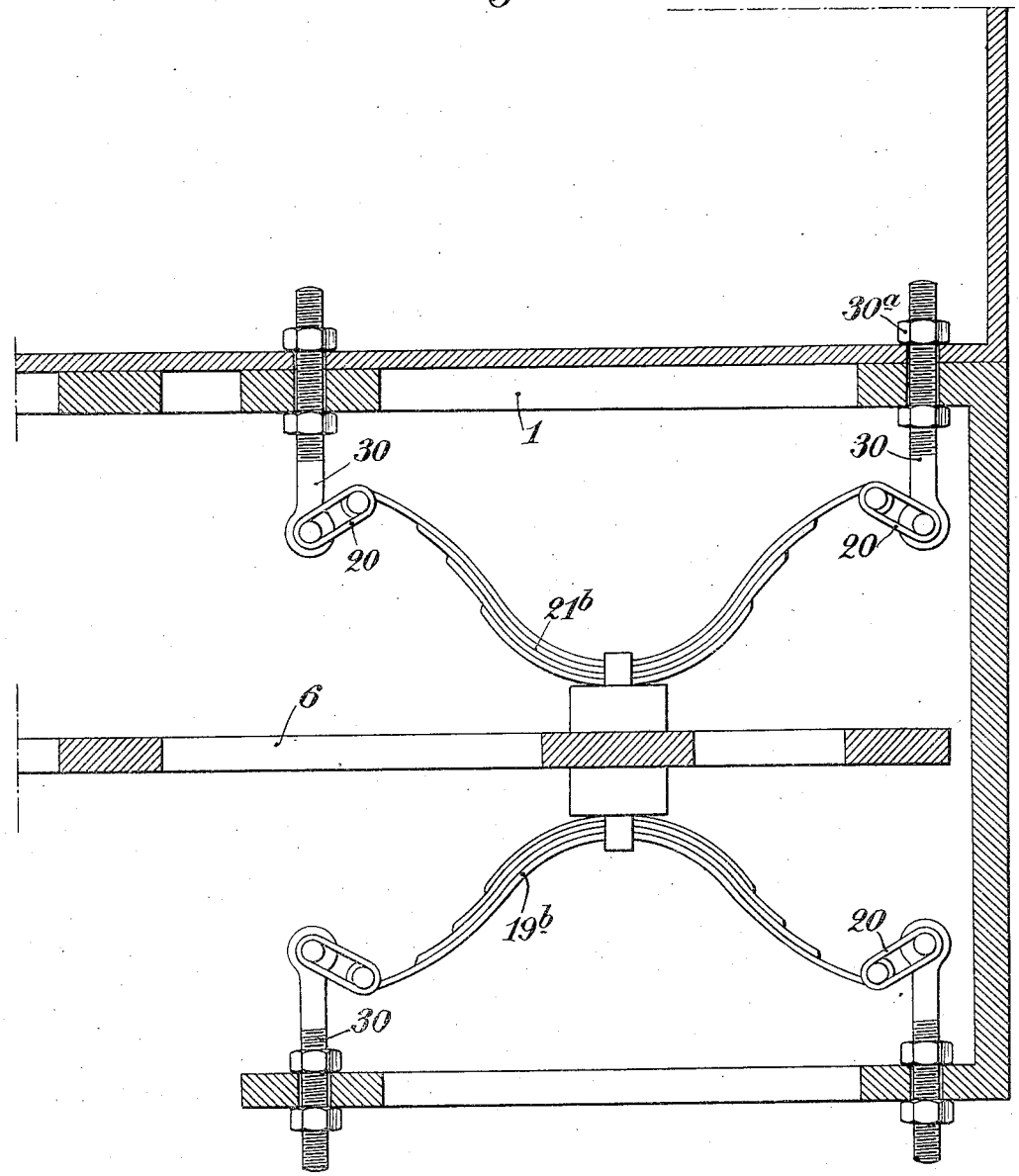
Fig. 7 is a partial vertical cross-section of another embodiment.

For instance, as shown in Fig. 7, this result is obtained by the use of springs 19b, 21b arranged on either side e. g. of the floor 6 and interposed between the latter and the frame 1.

The shackles for attaching these springs are carried by bolts 30 secured to the frames 1 and 6 by means of nuts 30a so that by suitably screwing and unscrewing these nuts the bolts can be moved longitudinally and the tension of the springs, i. e the respective loads on either frame, can be adjusted.

The connection providing the actuation of one of these frames by the other, or the combination of the propelling stresses developed by either frame, can be obtained by any suitable means such as connecting rods, diagonal struts, or again by horn plates. In the example illustrated in Fig. 3, this result is obtained by means of horn plates 22 attached to the frame 1 and securing the ends of the axles 10, without preventing the vertical movements of the latter.

Figs. 8 to 17 illustrate improvements in such vehicles whereby axles or bogies belonging respectively to different wheel sets are adapted for relative side displacements to allow the negotiation of curves while continuing to perform their functions, i. e. one of them carrying the car frame and the other the floor frame in the desired conditions.

These improvements allow to take the best advantage of the desirable features of the vehicles above described and particularly to set no limitation on the wheel base allowed between the carrying axles of the carriage frame.

Effectively, where the wheels of the carriage-carrying sets are provided with guide flanges as stated, the carriage will normally follow the curves of the railway track while the wheels of the floor frame carrying set must slide laterally on the rail when running through curves. It follows that, for a given tire width for the last mentioned wheels and for a given minimum radius of curvature of the track there is a maximum wheel-base which must not be exceeded: beyond such wheel base the displacement of the unguided wheels with respect to the rails when negotiating such a minimum radius curve would effectively be such that these wheels would no longer bear on the rail.

Therefore, the maximum wheel base bears a direct ratio with the tire width of these wheels, a width which necessarily has a limit.

Where this maximum wheel base is consistent with the length and capacity of the carriage, there is no inconvenience in using flangeless wheels, but this will not be the case where a longer wheel base is desired.

This device allows to increase the wheel-base without increasing the tire width. Where the carriage frame carrying set has flanged wheels it will do away with the side slipping of the floor frame carrying set wheels on the rails in curves, and conversely.

For instance, in the first case, each axle of the wheel set corresponding to the floor frame while carrying the said frame is so mounted that it can move laterally with respect to the axles provided with guide-wheels.

Such lateral movement may be obtained by securing the said axle by means of sliding sleeves pivoting under the floor. The said axle may be connected e. g. to the floor by suspension devices comprising either leaf springs mounted on long shackles or coil springs the side resiliency of which allows this movement without the interposition of friction or sliding members; such resiliency will allow a slight distortion of the coil springs the lower end of which, bearing on the axle, follows the latter, while its upper end follows the floor supported thereby.

The lateral displacement of the axle may be controlled by a suitable mechanical transmission gear connecting it to a flanged wheel axle this transmission gear being of such type that this last mentioned axle by moving to follow the curve of the track, will influence the first one in such manner that same will also follow the curve.

The wheels of the axle to be controlled may also preferably be provided with guide flanges of such type that the said axle will automatically follow the curve of the railway track.

It is to be noted that such guide flanges do not show the above mentioned inconveniences of ordinary wheel flanges. In fact, the latter must be rigid and of very rugged construction as they have to guide the entire vehicle, and owing to the inertia of the latter they are subjected to considerable stresses; the flanges of the device described have only to drive the axle owing to the lateral movableness of the same with respect to the frame carried thereby, which movableness is obtained as above stated, while the vehicle is guided by the guide-wheel axles.

Where a movable axle so designed is a driving axle, any suitable thrust device will be provided to transmit the driving effort set up thereby to the remaining portion of the vehicle, e. g. ball-and-socket links arranged between the axle and the floor frame or the carriage frame or a guide-wheel axle, the said links being suitably designed to allow the lateral displacements of the driving axle.

The said axle may also be arranged in a casing which, if it carries e. g. the floor frame, will be guided between horn plates rigid with the carriage frame, the bearing spring being arranged between this casing and a cross beam of the floor frame, which cross beam is guided vertically with respect to the carriage frame.

The said casing has a sufficient lateral play with respect to the horn plates guiding the same to allow the axle to move according to the curve of the railway track. Besides, a returning device can be provided which constantly tends to restore the axle and its casing into their middle positions and which acts the same for that purpose at right angles to the axis of the track, this returning device comprising e. g. springs arranged between the axle casing and the carriage frame.

Where the carriage is carried on bogies, arrangements similar to those described may be used; the bogie king bolt or the bogie itself will then be mounted as stated for allowing its lateral movements.

The wheels provided with rail tires and the wheels having pneumatic tires may be replaced depending on the requirements by wheels having their hubs suspended either by rubber spokes or by pneumatic tires interposed between the hub and the tire, the latter being made of steel or rubber.

Figure 8:
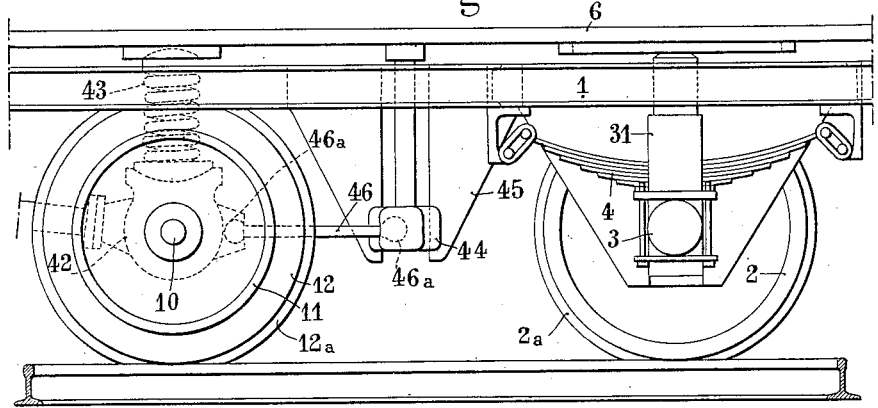
Figure 9:
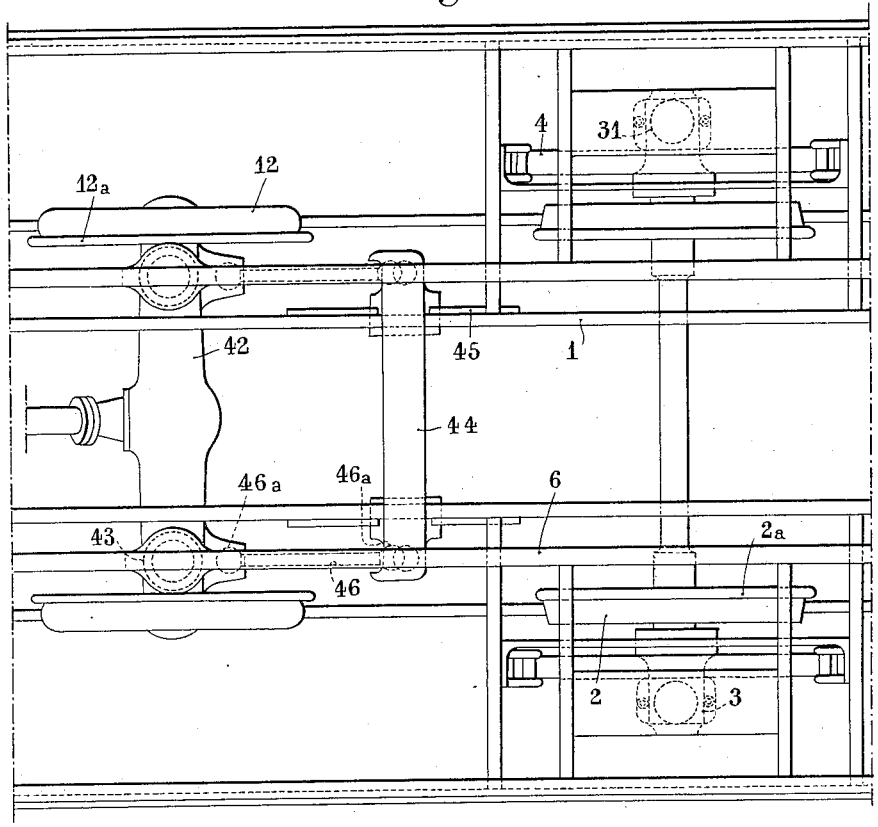

In the embodiment shown in Figs. 8 and 9 the carriage frame 1 is carried and guided by wheels 2 having flanges 2a through the intermedium of springs 4 and axles 3.

The frame of the floor 6 is carried by axles 10 having wheels 11 provided with pneumatic tires 12. It may also bear partly on the axles 3 through the intermedium of pressure cylinders 31, according to an arrangement described above;

According to the invention, the axles are arranged as follows:

Each axle 10 is housed in a casing 42, on which the frame 6 rests through the intermedium of coil springs 43, the deflection of which allows the lateral displacements of the axle when negotiating curves. The wheels are guided on the rails by flanges 12a carried by the tires 12. These flanges 12a, which have to guide the axle only, may be designed so that no prejudicial influence will result on the flexibility of the suspension of the frame 6.

In this embodiment the axle 10 is assumed to be a driving axle. The thrust is then transmitted to a cross beam 44, rigid with the frame 6 and vertically guided, between horn plates 45 rigid with the frame 1, by links 46 provided with ball-and-socket joints 46a allowing the lateral displacements of the axle 10, while transmitting the driving thrust to the vehicle.

Figure 10:
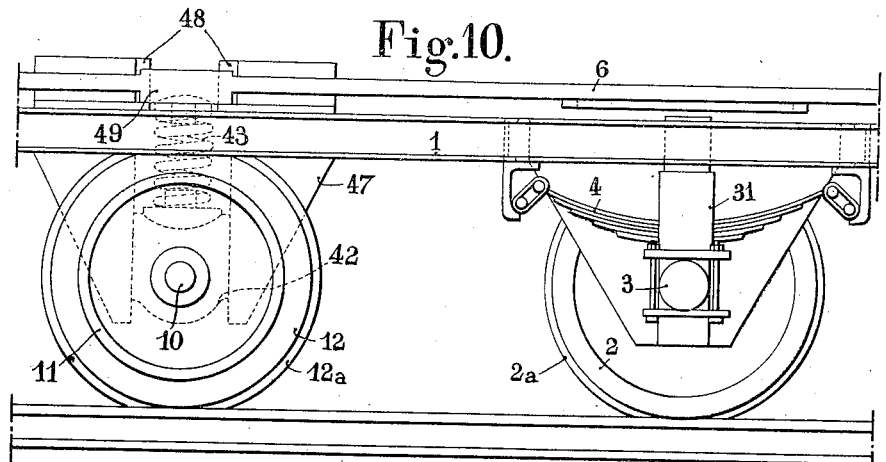
Figure 11:
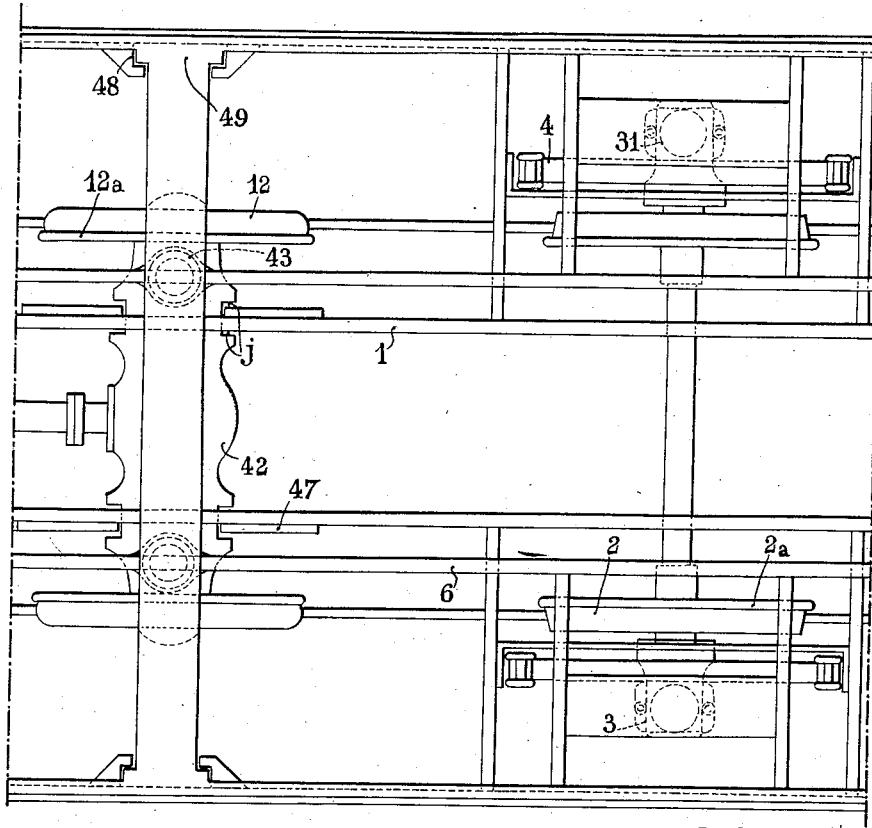

According to the modification illustrated in Figs. 10 and 11, the driving effort is transmitted to the frame 1 by horn plates 47, rigid with the frame and between which the casing 42 is movable vertically. The said casing moreover has a lateral play j relatively to the said plates, which allows the necessary displacements when negotiating curves.

The pull is transmitted to the frame 6 through vertical slides 48, between which the cross beam 49 of this frame which rests on the bearing springs 43 is movable. The floor frame is acted on through the said connecting means while remaining free to move vertically with respect to the carriage frame.

Figure 12:
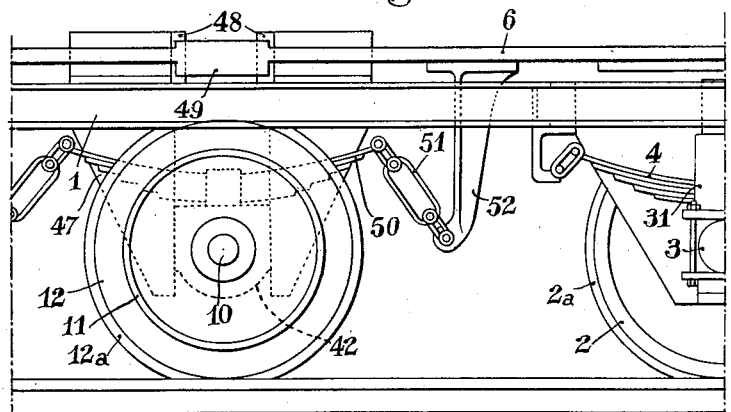
Figure 13:
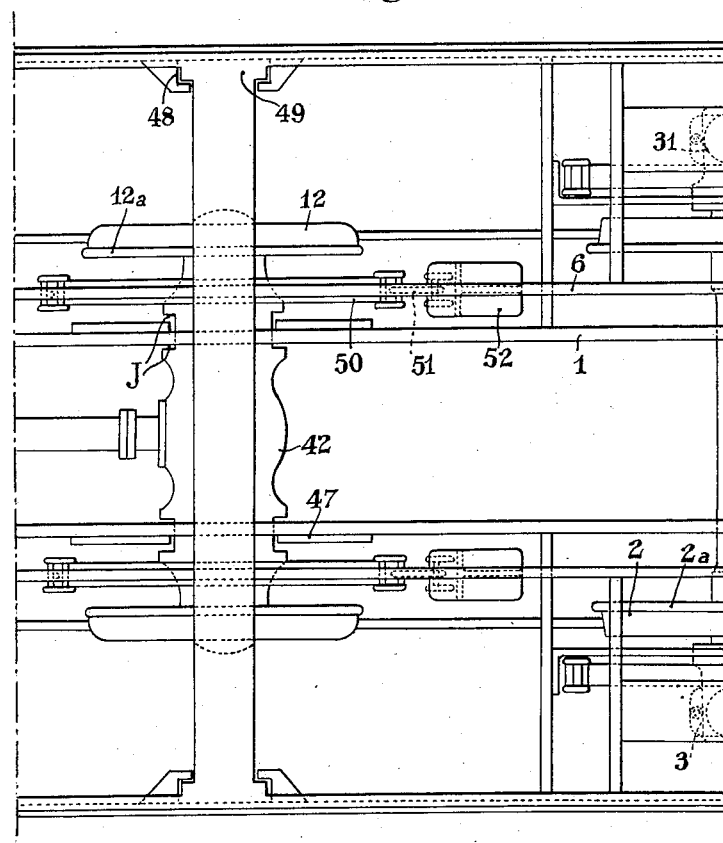

Figs. 12 and 13 illustrate another modification in which the frame 6 is supported on leaf springs 50, instead of the coil springs 43. The lateral displacements of the axle 10 are permitted by the use of long connecting shackles 51 between the springs 50 and securing members 52 rigid with the frame 6. The axle 10 is returned towards the axis of the track by the said shackles.

Figure 14:
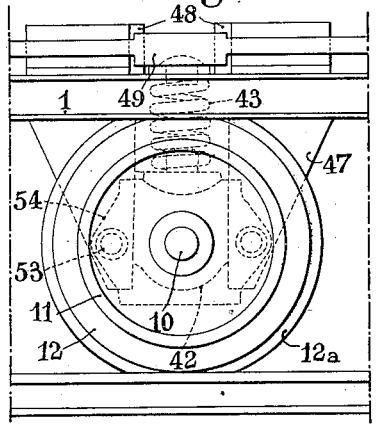
Figure 15:
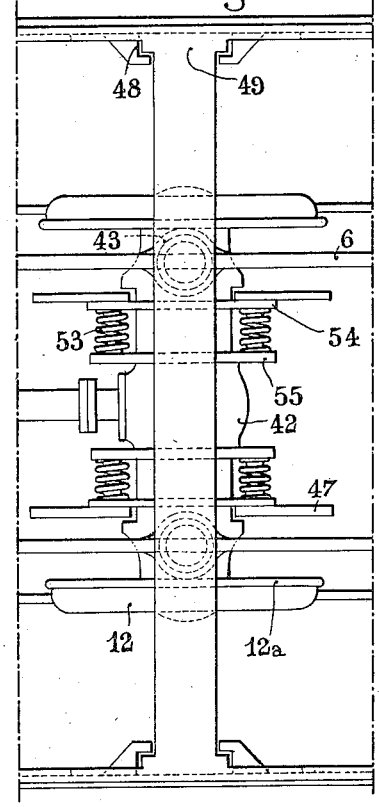

In the embodiments illustrated in Figs. 14, 15, 16 and 17, the axle 10 is returned towards the axis of the railway track by special springs arranged as follows:

According to Figs. 14 and 15, transverse coil springs 53 are compressed between plates 54, through which they bear against the horn plates 47 and other plates 55, by means of which they bear against the casings 42 and push them back towards the axis of the railway track.

Figure 16:
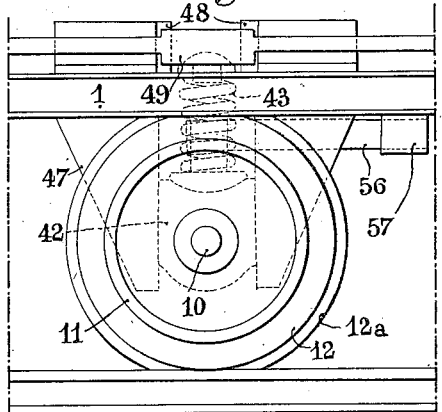
Figure 17:
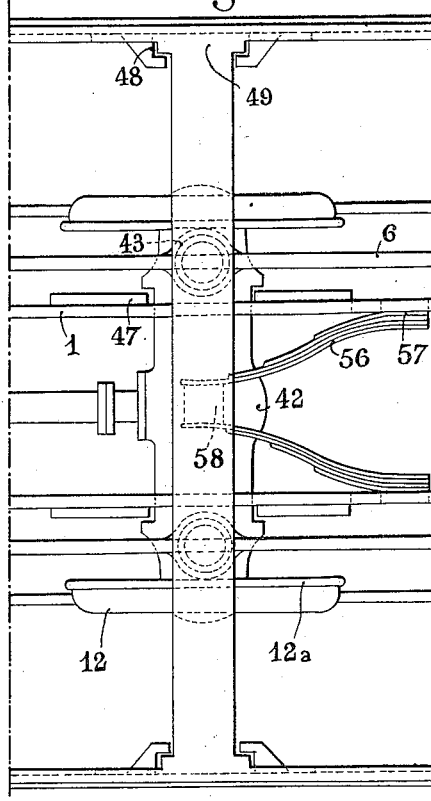

As shown in Figs. 16 and 17, the axle is returned by leaf springs 56, e. g. of the semi-cantilever type, one end of which is secured to the frame 1 at 57 while the other end bears against an abutment 58 on each casing 42.

I claim:

1. In a vehicle, the combination of several elements adapted to move relatively to each other in the vertical direction only, sets of wheels independent from each other and respectively supporting each of the said elements, suspension members between one of these elements and the set of wheels supporting it, means for causing an increasing fraction of the weight of the said element to bear on at least one of the sets of wheels carrying the other elements when the tension of the said suspension members increases, and conversely.

2. In a vehicle, the combination of at least two elements adapted to move relatively to each other in the vertical direction only, independent sets of wheels respectively supporting each of the said elements, an abutment mounted on one of these elements, means for vertically moving this abutment relatively to the element on which it is mounted, and a compression spring arranged between this abutment and the second element.

3. In a vehicle, the combination of at least two elements adapted to move relatively to each other in the vertical direction only, independent sets of wheels respectively supporting each of the said elements, an abutment mounted on one of these elements, means for vertically moving this abutment relatively to the element on which it is mounted, two compression springs arranged between the second element and the said abutment, respectively above and below the latter.

4. In a vehicle, the combination of at least two elements adapted to move relatively to each other in the vertical direction only, independent sets of wheels respectively supporting each of the said elements, a cylinder connected to one of these elements, a piston connected to the other element and sliding in the said cylinder, a fluid between the piston and the cylinder, and means for causing the pressure of this fluid to vary.

5. In a vehicle, the combination of at least two elements adapted to move relatively to each other in the vertical direction only, independent sets of wheels respectively supporting each of the said elements, above and below one of these elements, a piston and a cylinder respectively connected to each of the two said elements and adapted to compress a fluid between them, and means for causing the pressure of this fluid to vary.

6. In a vehicle, the combination of at least two elements adapted to move relatively to each other in the vertical direction only, independent sets of wheels respectively supporting each of the said elements, a piston and a cylinder respectively connected to each of the two said elements, a pressure fluid distributing system connected to the said cylinder and mounted on one of the elements, suspension members between this element and the set of wheels carrying it and means adapted to actuate the said distributing system when the element on which it is mounted vertically moves relatively to its set of wheels.

7. In a vehicle, the combination of at least two underframes, arranged one within the other and each rolling on its own wheels, means for rendering both these underframes horizontally rigid with each other, means for allowing the relative vertical displacement of these two underframes, and means for transferring an adjustable portion of the weight from one underframe to the other.

8. In a vehicle, the combination of at least two underframes, arranged one within the other and each rolling on its own wheels, means for rendering both these underframes horizontally rigid with each other, means for allowing the relative vertical displacement of these two underframes, distinct suspensions of different resiliency between these underframes and the corresponding wheels, resilient supports interposed between both underframes and adapted to be alternately compressed when one of the underframes rises and moves down relatively to the other, and means for adjusting the tension of each of these resilient supports.

EMILE RIMAILHO.